S. MARSEK.
AEROPLANE.
APPLICATION FILED AUG. 6, 1920.
1,383,652.
Patented July 5, 1921.
2 SHEETS—SHEET 1.
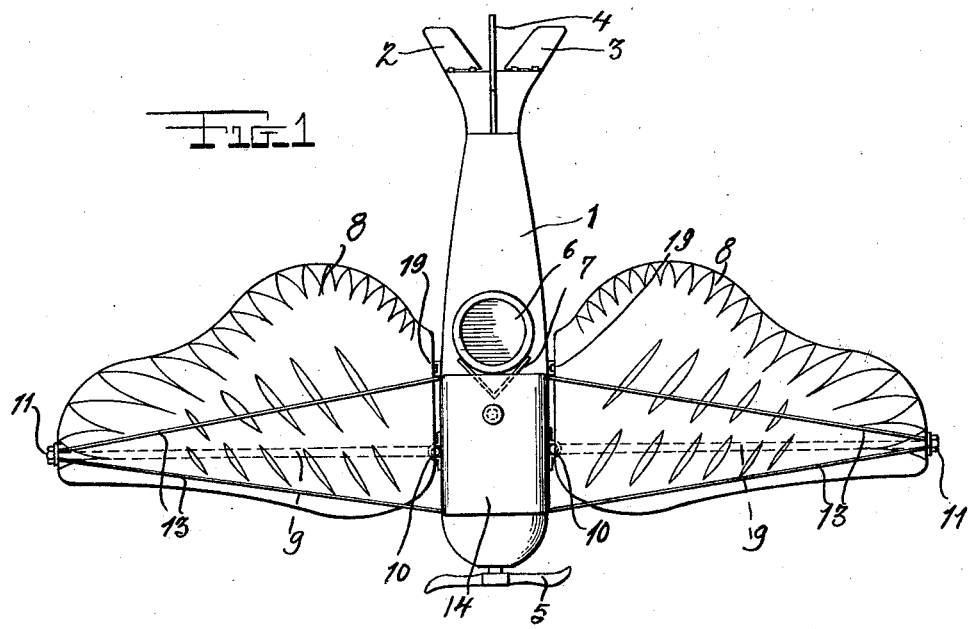
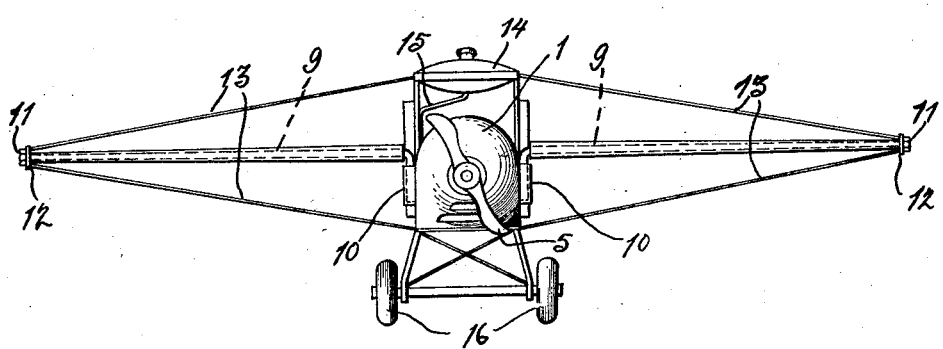

S. MARSEK.
AEROPLANE.
APPLICATION FILED AUG. 6, 1920.
1,383,652.
Patented July 5, 1921.
2 SHEETS—SHEET 2.
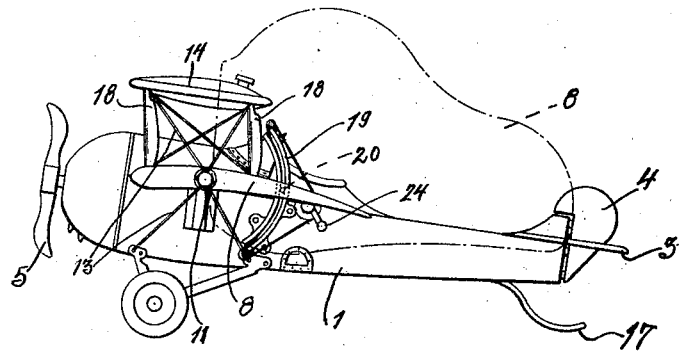
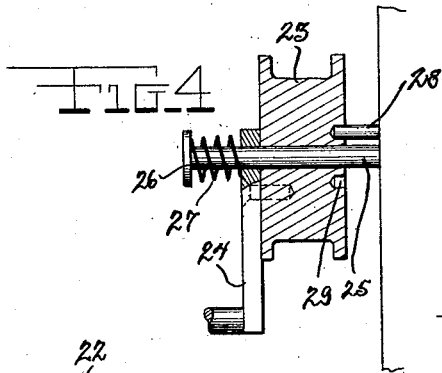
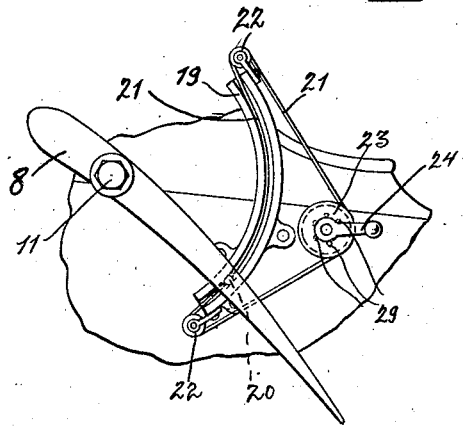
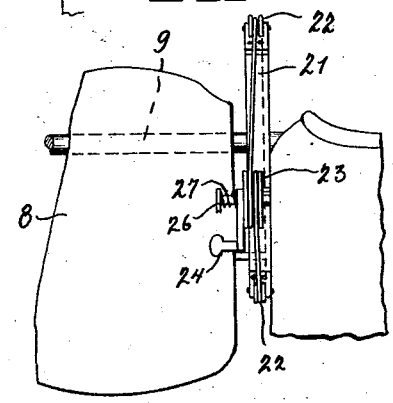
Inventor
S. Marsek
By his Attorney
Hedeman

UNITED STATES PATENT OFFICE.

STEVEN MARSEK, OF NEW YORK, N. Y.

AEROPLANE.

1,383,652. Specification of Letters Patent. Patented July 5, 1921.

Application filed August 6, 1920. Serial No. 401,723.

*To all whom it may concern:*

Be it known that I, STEVEN MARSEK, a citizen of the United States, residing at New York, in the county of New York and State of New York, have invented certain new and useful Improvements in Aeroplanes, of which the following is a specification.

The main object of this invention is to provide an aeroplane that will be able to ascend at a steep incline and without first traveling any material distance along the horizontal.

Another object is to provide a small collapsible aeroplane that will be able to turn sharply in its flight from one direction to another and that will be able to quickly recover its balance after a steep descent or "nose dive".

The above and other objects will become apparent in the description below, in which characters of reference refer to like-named parts in the drawings.

Referring briefly to the drawings, Figure 1 is a plan view of my aeroplane in flight.

Fig. 2 is a front view of the same.

Fig. 3 is a side view of the same, showing the position, in dotted lines, of the wings when collapsed or folded back.

Fig. 4 is an enlarged detail view, partly in section, of the wing-operating mechanism.

Fig. 5 is another enlarged detail view of the wing operating mechanism.

Fig. 6 is a side view of the detail shown in Fig. 5.

Referring now in detail to the drawings, the numeral 1 represents the body of my aeroplane, having horizontal tail members 2 and 3, and a vertical tail member 4. The usual propeller is indicated at 5, and the driver's seat at 6. An acute-angled windshield is provided at 7. The wings are preferably of the form shown, at 8, and they are pivotally mounted upon shafts 9 which run through the entire lengths of the wings. Said shafts are bent at right angles adjacent the body 1, so that the vertical portion is pivotally mounted in a sleeve or bearing 10 rigid with the body 1. The end of the shaft 9 is screw-threaded, and a nut 11 is applied thereon to hold the wing in place. A washer or the like 12 lies between the nut and the wing. Said washer is provided with a series of holes or the like, not shown, by which wires 13 are secured thereto, said wires being attached also to the body 1 and the frame extending upward therefrom. Thus it is apparent that, by removing the nuts 11 and the washers 12, the wings may be folded back against the body in the position shown in Fig. 3.

A gasolene tank is provided at 14, and a pipe 15 leads therefrom to the motor within the body 1. The usual wheels are shown at 16. At 17 is shown a leg member which supports the aeroplane when upon the ground, and which is of such a height and curvature, that the aeroplane is at that time in a position to begin its ascent at a sharp angle.

Uprights 18 extend above the body 1 and support the gasolene tank 14; they also provide a frame to which are attached the wires 13, as aforementioned.

Secured to the body 1, on either side, are arcuate slotted frame members 19 in which are adapted to slide pins 20 rigid with the wings 8. An endless cord 21 is secured to said pin, and the same passes over pulleys 22 at either end of said slotted frame and also over a wheel 23, said cord passing several times around the latter. A handle 24 provides means for moving said cord. It is now apparent that, upon turning of the handle 24, the wings may be inclined to any desired angle, the action of the wings in turning about the shafts 9 being quick. This is particularly advantageous in the "nose dive." Since the wings are independently operated, by inclining one wing upward and the other downward, the aeroplane may be made to fly in "pin wheel" fashion. In order to releasably lock the wings in any desired inclined position, the wheel 23 is mounted upon a shaft 25 having a head 26, spring 27 lying between said head and the wheel. A pin 28 extends from the body 1, and a plurality of recesses 29 are provided in the surface of the wheel to be engaged by said pin 27. Thus, before turning the wheel, the handle 24 is first moved outward to free the wheel from the pin 27.

As shown in Fig. 5, the pin 20 may be entirely removed from the slot 19 at either end of said slot. Therefore, before the wing may be folded back against the body as above mentioned, the pin is removed from the slot by rotating the wing about the shaft 9, and then the cord 21 is slipped from the pulleys 22, whence the wing is farther rotated about the shaft 9 until the wing is in a vertical plane. Then the wing is simply folded back upon the bearing 10, into the position shown dotted in Fig. 3.

I claim:

1. An aeroplane comprising a body, substantially L-shaped rods, vertical sleeves on said body, the shorter arms of said L-shaped rods having pivotal support in said sleeves, wings mounted upon the longer arms of said L-shaped rods, said longer arms passing entirely through said wings and providing shafts upon which said wings are adapted to turn, releasable means at the ends of said longer arms for securing said wings in place, arcuate slotted frames supported upon said body, pins extending from said wings and adapted to engage said slotted frames, and means for varying the position of said pins in said slotted frames.

2. An aeroplane comprising a body, substantially L-shaped rods, vertical sleeves on said body, the shorter arms of said L-shaped rods having pivotal support in said sleeves, wings mounted upon the longer arms of said L-shaped rods, said longer arms passing entirely through said wings and providing shafts upon which said wings are adapted to turn, removable means at the ends of said longer arms for retaining said wings upon said shafts, arcuate slotted frames supported upon said body, pins extending from said wings and engaging said slotted frames, endless cords attached to said pins, pulleys at the ends of said frames, hand wheels pivotally mounted upon said body, said cords passing about said pulleys and around said handwheels, and means for releasably retaining said wings in any desired inclined position.

In testimony whereof I affix my signature.

STEVEN MARSEK.